United States Patent [19]
Navid et al.

[11] Patent Number: 5,179,361
[45] Date of Patent: Jan. 12, 1993

[54] COMPANDOR SYSTEM WITH STABLE AND WIDELY ADJUSTABLE UNITY GAIN LEVEL

[75] Inventors: Nasrollah S. Navid, Saratoga; Michael J. DeLurio, San Jose, both of Calif.

[73] Assignee: North American Philips Corp., Tarrytown, N.Y.

[21] Appl. No.: 700,279

[22] Filed: May 15, 1991

[51] Int. Cl.⁵ .............................................. H04B 1/64
[52] U.S. Cl. ...................................... 333/14; 307/261; 307/264
[58] Field of Search .......................... 333/14; 455/72; 381/106; 307/263, 268, 491, 494, 261, 264

[56] References Cited

U.S. PATENT DOCUMENTS

| | | | |
|---|---|---|---|
| 4,220,875 | 9/1980 | Lawton | 333/14 X |
| 4,547,741 | 10/1985 | Katakura | 333/14 X |

OTHER PUBLICATIONS

Signetics Linear Data Manual, vol. 1: Communications, 1989, pp. 4-334-4-340, 4-346.

*Primary Examiner*—Paul Gensler

[57] ABSTRACT

A compandor system is provided that uses integrated circuitry in combination with fully external controlling devices for unity gain level adjustment without affecting the dynamic range. In addition, the system's stability is maintained. The external control is provided, for instance, by replaceable discrete resistors.

18 Claims, 2 Drawing Sheets

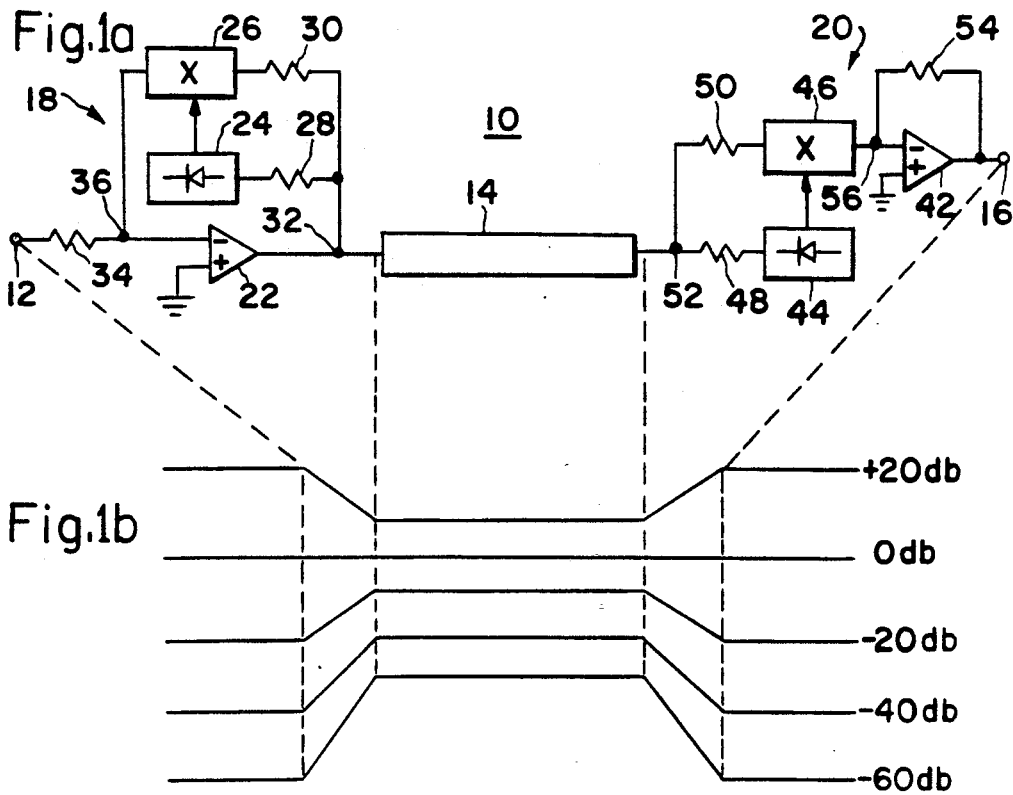
Fig.1a
Fig.1b
$$i)\ A_c \propto \sqrt{\left(\frac{R_{28}\cdot R_{30}\cdot I_{ref}}{R_{34}\cdot V_{12}(avg)}\right)}$$
$$ii)\ A_e \propto \left(\frac{R_{54}\cdot V_{52}(avg)}{R_{48}\cdot R_{50}\cdot I_{ref}}\right)$$
$$iii)\ A_c \propto \sqrt{\left(\frac{R_{28}\cdot R_{30}}{R_{34}\cdot R_{ref}}\cdot \frac{V_{ref}}{V_{12}(avg)}\right)}$$
$$iv)\ A_e \propto \left(\frac{R_{54}\cdot R_{ref}}{R_{48}\cdot R_{50}}\cdot \frac{V_{52}(avg)}{V_{ref}}\right)$$
Fig.2
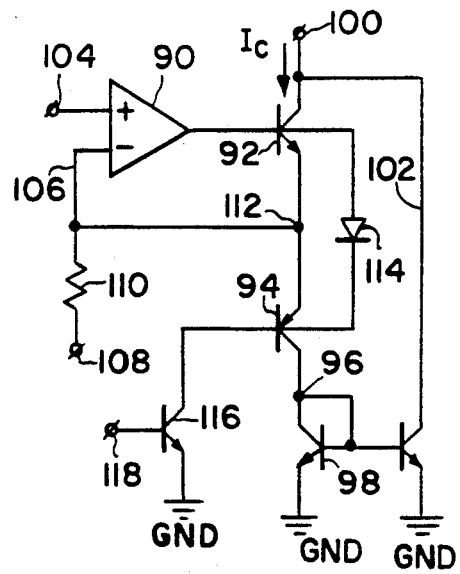
Fig.4

COMPANDOR SYSTEM WITH STABLE AND WIDELY ADJUSTABLE UNITY GAIN LEVEL

FIELD OF THE INVENTION

The invention relates to an electronic compandor system having a signal input, a signal compressor coupled to the signal input, and a signal expandor coupled to the compressor through a transmission channel and coupled to a signal output. The invention also relates to a compressor and an expandor for use in such a system, and to integrated circuits for use in such a compressor or expandor.

BACKGROUND ART

A compandor system is a data transmission system that includes a signal compressor coupled to one end of a transmission channel, at the other end of which a signal expandor is located. The compressor compresses the amplitude of a signal in such a way that all contributions to the compressed signal lie above the noise level inherent to the transmission channel, but do not run into the maximum dynamic range limits of the channel. Clipping and distortion are thereby avoided. At the receiving end of the channel, the expandor performs the inverse operation on the transmitted signal to restore or adapt it for further processing. Thus, the signal is accommodated to the transmission channel's limitations. In, for instance, tape decks, cordless telephones and wireless microphones, the compandor performs noise reduction. For signal level control, the compandor plays an important part in, for example, electronic organs, modems and mobile telephone equipment.

The idea of signal companding originated at Bell Laboratories in the forties. Compandors then included transformers, hybrids and passive components. In the midst of the seventies Signetics Company, a part of North American Philips Corporation, was the first company to manufacture an integrated circuit compressor and expandor. Nowadays, a wide variety of integrated compandors are available. See, for in, "AN176 Compandor Cookbook", *Linear Data Manual Volume* 1: *Communications,* Signetics Co., 1989, pp. 4-334/4-340.

A prior integrated compressor circuit and a prior art integrated circuit of the considered kind may each include the followingparts: a voltage-to-current converter for converting an input voltage into a control current; a current multiplier coupled to the converter for supplying an output current substantially proportional to both the input current and the control current and substantially inversely proportional to a reference current; and a differential amplifier coupled to the multiplier for receiving at an input a voltage indicative of the output current.

In both circuits, the voltage-to-current converter has an input coupled to a first node through a first resistor. The converter provides the control current at a control output. The control current is indicative of the voltage at the first node. The control current is, for instance, proportional to the time-averaged value of the voltage at the first node and inversely proportional to the value of the first resistor. The current multiplier has an input coupled to the first node through a second resistor for receiving the input current which is proportional to the voltage at the first node and inversely proportional to the value of the second resistor. The control output of the voltage-to-current converter is coupled to the current multiplier. The current multiplier supplies an output current to a second node.

The compressor circuit and the expandor circuit mainly differ in the way the amplifier is coupled to the other parts. In a compressor circuit, an inverting input of the amplifier is coupled to the second node and to the system's signal input through a further resistor. A non-inverting input of the amplifier is coupled to a reference node for receiving a reference voltage, and an amplifier output is coupled to the first node and to the system's channel. In the expandor, the inverting input is coupled to the second node and to the amplifier output through a further resistor, the non-inverting input is coupled to a reference node for receiving a reference voltage, and the first node is coupled to the channel.

One of the quantities that determine the operation of the compressor or expandor is the unity-gain level. The unity-gain level is the signal level that passes unaltered through the compressor or the expandor, as the case may be. Another quantity that is an indication of the system's performance is the dynamic range. This is the range of signal levels that can be processed without running into problems involving noise and signal distortion caused by clipping. The dynamic range in general is the largest when the quiescent operating voltage (bias voltage) is substantially halfway between the supply voltages of the compressor or the expandor.

Integrating a compandor leads towards compromises in the performance of the device, as a consequence of the particular integrating technology used and the particular application intended of the compandor. Therefore, the performance of the known circuits is optimized with regard to the dynamic range, set by the supply voltage, and the noise characteristics of the particular transmission channels used. This results, among other things, in a fixed compandor's unity gain level dedicated to a particular application.

For instance, the Signetics compandor circuits NE570 and NE571 have unity gain levels of 776 mV rms. The Signetics compandor circuit NE575 has a unity gain level of 100 mV rms, and the Signetics compandor circuit NE5750 has a unity gain level of 77.6 mV rms. These fixed unity gain levels are now well-established standards.

The integrated circuit's fixed unity gain level is a trade-off between device performance and technology available in view of the device parameters to be optimized. The known devices permit some marginal calibration of the gain by means of adding external resistors, to be arranged in series with the integrated resistors. However, this either affects the dynamic range of the compressor or the expandor, or deteriorates the unity gain level even further due to the external resistors' additional temperature or process parameter spread dependencies. Furthermore, changing the resistor values by arranging external resistors in series with the integrated resistors only allows the aggregated resistor values to be increased, whereas a decrease cannot be attained. More importantly, the very limited calibration range is totally insufficient for purposes that require non-standard unity gain levels.

In the prior art, extending the application of these high-quality circuits beyond the predetermined unity gain levels has generally been accomplished by adding level-shifters to fixed-unity-gain circuits, for level-shifting the signal prior to compressing and/or after expanding. This, however, involves additional circuitry for the auxiliary operations and, as a consequence, leads to an increase in power consumption, noise contribution and cost. Especially in the field of portable equipment, e.g. for consumer applications, these are serious drawbacks.

OBJECTS OF THE INVENTION

The invention therefore has following objects: creating a compandor system with a unity gain level which is widely adjustable without affecting the dynamic range and without the need for level-shifters; supplying a compandor system with compressor and expandor integrated circuits wherein the unity gain levels of the compressor and expandor are separately adjustable; providing a compandor system with compressor and expandor integrated circuits wherein the unity gain level is stable with regard to temperature and process parameter spread; furnishing a compressor and an expandor for use in such a system; supplying multi-purpose integrated circuits for use in such a system.

SUMMARY OF THE INVENTION

To this end, the invention provides an electronic compandor system wherein at least the compressor or the expandor comprises an integrated circuit that includes: first and second nodes; a voltage-to-current converter adapted to be coupled to the first node through a first resistor for providing at a converter output a control current indicative of a signal voltage at the first node; a current multiplier adapted to be coupled to the first node through a second resistor for receiving an input current, the multiplier being coupled to the converter for receiving the control current. The multiplier supplies an output current at the second node substantially proportional to the input current and to the control current and substantially inversely proportional to a reference current. According to the invention, the integrated circuit comprises adjustment means for externally adjusting the reference current.

The principle of the invention is based on recognizing that the quality standards nowadays achievable in a variety of applications of compandor systems with integrated compressor and expandor circuits, widely extend beyond the requirements in normal use. Strictly speaking, the compandor does not need to function optimally with regard to some parameters previously considered critical, such as noise level or supply voltage level, that implicitly fixed the unity gain level. For a variety of applications, such as consumer apparatus, the compandor system in accord with the invention performs acceptably well within a wider parameter range than previously deemed feasible. Put into still other words, making the unity gain level externally adjustable or re-adjustable through varying said reference current renders the device much more versatile only at the expense, if any, of non-critical parameters having some near-optimum values.

In, for instance, consumer applications, the near-optimum functioning of the device, for instance, with regard to noise level is well compensated for by low power consumption due to the absence of level-shifters. The device now can be optimized to achieve low power consumption, to a certain extent irrespective of the supply voltage or the noise level, by letting the user adjust the unity gain level for a particular technical application. In fully integrated prior art compandors, this is altogether impossible. Since power consumption is a key factor in the field of portable equipment, a compandor system in accord with the invention can contribute considerably to an expansion of this technical domain. Large-scale production of such an externally adjustable, multi-purpose compandor for a variety of applications may also significantly lower the costs of the device.

Adjustment through the reference current does not interfere directly with the signal path as distinct from the addition of resistors for calibration of the prior art system. More importantly, adjusting the current does not affect the dynamic range. Also, the current can be increased or decreased, thereby raising or lowering the unity gain level, whereas in the prior art system the addition of series resistors the calibration only works into one direction.

The adjustment means may comprise, for instance, a terminal for connection to an external reference current source. For a particular application a matching reference current source can be connected to the system.

Alternatively, the adjustment means may include an externally adjustable constant current source as an integral part of the system. The externally adjustable constant current source includes, for instance, a voltage-controlled current source. The current then is made controllable through an externally applied control voltage, for instance, through an externally accessible control pin of the integrated circuit. In another embodiment, the constant current source may include an integrated voltage source, for instance, a bandgap voltage source, and an externally replaceable particular resistor connected to the voltage source for determining a particular current through the resistor. This particular current is thereupon, for instance, fed into a current mirror whose output establishes the reference current source. Thus, the reference current can be made inversely proportional to the value of the particular reference resistor.

The integrated circuit further includes a voltage-to-current converter that has an input coupled to the first node for receiving the input current and an output coupled to the multiplier for supplying the control current. The input current is an indication of the signal voltage at the first node. In accordance with the invention, the maximum amount of input current that can be dealt with by the converter is made adjustable as well. Consequently, its power consumption can be adapted to the input signal level. This avoids some of the disadvantages associated with a fixed input current receiving capability. For instance, a too large capability would involve an unnecessarily large power consumption, whereas a too small one would cause signal distortion.

As known from the prior art and as will be explained in further detail below, the algebraic gain expressions for the compressor and expandor depend on the values of the above mentioned first, second and further resistors, and on the reference current in the current multiplier. By making the reference current inversely proportional to the value of the reference resistor in the invention, the value of the reference resistor in these expressions takes on a specific relation to the values of the other resistors. The values of the first and second resistors form a product in the numerator or denominator of a quotient, whereas the values of the further and reference resistors form a product in the denominator or numerator of the quotient, respectively. According to the invention, one of the first and second resistors is also a discrete resistor. The other resistor and the further resistor remain fully integrated. For each resistor represented in the denominator there now is a resistor represented in the numerator, and vice versa, for which the temperature and fabrication parameter spread dependencies are substantially identical. Owing to the quotient, these dependencies cancel, which results in stable operation of the circuit.

As indicated in the background art section, both compressor and expandor circuits utilize the same type of parts interconnected in slightly different manner. Therefore, the present integrated circuit having a voltage-to-current converter and a current multiplier with a reference current source that is externally adjustable is a highly versatile building block. Firstly, it is usable in both the compressor and in the expandor. Secondly, it makes the compressor and/or the expandor widely and independently adjustable with regard to the unity gain level. Implementing the circuit for connection to a discrete reference resistor and a discrete first or second resistor establishes stability. Thirdly, an integrated circuit in accordance with the invention can be used in any environment where it is necessary to attenuate or amplify a first signal in response to a second signal under control of externally exchangeable resistors.

Preferably, the differential amplifier is implemented in the same integrated circuit. Preferably, the integrated circuit is then provided with switching means for selectively operating the circuit as part of the compressor or as part of the expandor. The switching means interchange the coupling of the first and second nodes to the amplifier. This particular arrangement allows two-way signal transmission through the channel using the same circuits.

BRIEF DESCRIPTION OF THE DRAWING

The invention will be explained in further detail and by way of example with reference to the accompanying drawing, in which:

FIGS. 1a–b show diagrams for explaining a compandor's operation;

FIG. 2 gives relevant formulae for the unity gain levels;

FIG. 4 is a circuit diagram of a converter in the invention;

DETAILED DESCRIPTION OF THE EMBODIMENTS

Compandor System

Figure 3:
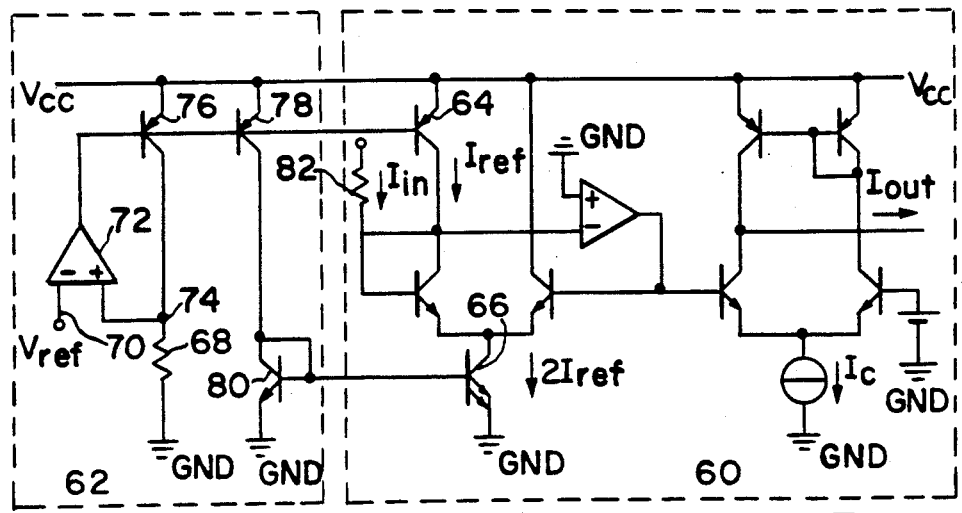
FIG. 3 shows an example of a current multiplier for furnishing the required current dependencies according to the invention.

FIG. 1a shows the basic constituents of a compandor system 10. In order to transmit an input signal at an input terminal 12 through a transmission channel 14 with a limited dynamic range to an output terminal 16, the signal is to be accommodated to the channel's limitations. To this end, a compressor 18 operates on the signal's amplitude in such a way that it has a higher gain for lower amplitudes and a lower gain for high amplitudes. Thus, the obtained modified signal at the output of compressor 18 is adapted to channel 14, avoiding distortion or clipping at high-amplitude levels, and avoiding drowning in the channel noise at low-amplitude levels. At the receiving end of channel 14, the modified signal is fed into an expandor 20 that performs the inverse operation. That is, it amplifies the received signal in such a way that it has higher gain for higher amplitudes and lower gain for lower amplitudes. This restores the original signal and makes it usable for further processing. The signal's compression, subsequent transmission and eventual expansion are visualized in FIG. 1b which shows the coherence among the various signal levels along the signal path.

Compressor 18 comprises a differential amplifier 22, a voltage-to-current converter 24 and a current multiplier 26. First and second resistors 28 and 30 couple a first node 32 at the output of amplifier 22 to voltage-to-current converter 24 and current multiplier 26, respectively. A further resistor 34 couples system input 12 to a second node 36 at the inverting input of amplifier 22. The output of current multiplier 26 is coupled to second node 36.

Note that expandor 20 similarly includes a differential amplifier 42, a voltage-to-current converter 44, a current multiplier 46, and first, second and further resistors 48, 50 and 54 arranged differently. Channel 14 is coupled through a first node 52 to first and second resistors 48 and 50. The output of current multiplier 46 is coupled through a second node 56 to the inverting input of amplifier 42 and to further resistor 54 located between second node 56 and the output of amplifier 42. The output of amplifier 42 is connected to system output 16.

Voltage-to-current converters 24 and 44 provide control currents proportional to the time-averaged values of the voltage at first nodes 32 and 52, respectively. Current multipliers 26 and 46 supply output currents to second nodes 36 and 56, respectively. The output current supplied to second node 36 is proportional to the current received from first node 32 and to the control current supplied by voltage-to-current converter 24, and is inversely proportional to a reference current internal to multiplier 26. Correspondingly, the output current to second node 56 is proportional to the current received from first node 52 and to the control current furnished by voltage-to-current converter 44, and is inversely proportional to a reference current internal to multiplier 46.

Formulae

Hereinafter in the text and drawing, the following notation is used. The value of a resistor marked with a reference numeral "j" in the drawing is represented as "$R_j$". The values of the control current from voltage-to-current converter 24 or 44 is symbolized by $I_c$. The value of the output current from multiplier 26 or 46 is indicated by $I_{out}$. The value of the current that flows into multiplier 26 or 46 from first node 32 or 52 is identified as $I_{in}$. The internal reference current in multiplier 26 or 46 is designated as $I_{ref}$. The signal voltage at a node with reference numeral "k" is denoted as $v_k$. The time-averaged signal voltage at node k is referred to as $v_k(avg)$.

FIG. 2 shows expressions for the signal amplification or gain, A, for compressor 18 and expandor 20. Formula i) is the expression for the gain $A_c$ of a known compressor. Formula i) indicates that the gain $A_c$ is proportional to the square root of the term between parentheses. This term is an algebraic relationship in $R_{34}/(R_{28}*R_{30})$, $v_{12}(avg)$, and $I_{ref}$. Similarly, formula ii) is the expression for the gain $A_c$ of a known expandor and indicates a proportionality to the term between parentheses. This term is an algebraic relationship in $R_{54}/(R_{48}*R_{50})$, $v_{52}(avg)$ and $I_{ref}$. The unity gain level of the compressor or the expandor is the level of $v_{12}(avg)$ or $v_{52}(avg)$, respectively, for which the associated gain A equals unity.

In the prior art circuits, the resistors whose values appear in formulae i) and ii) are integrated resistors, whereas the reference current is fixed. For calibration purposes external resistors can be connected to the prior art circuit for creating series arrangements with the integrated resistors, thereby marginally adjusting the unity gain level. In the known circuits, special attention must be paid to the resistor arrangements that affect $R_{34}$ and $R_{54}$, since resistors 34 and 54 determine the bias level and, as a consequence, the dynamic range of the circuit. Consequently, for keeping the dynamic range constant calibration is limited to resistors 28 and 30, or 48 and 50.

In the invention, constant reference current $I_{ref}$ is made externally adjustable. This can be accomplished in a variety of ways. For instance, a voltage-controlled reference current source may furnish current $I_{ref}$ at a value that depends on a control voltage externally applied.

Preferably, the reference current is made inversely proportional to a replaceable discrete reference resistor with value $R_{ref}$ by means of an integrated reference voltage source that supplies a reference voltage $V_{ref}$. Substitution of $V_{ref}/R_{ref}$ for $I_{ref}$ in formula i) and in formula ii), results in formulae iii) and iv), respectively. The denominator of the term in parentheses of formula i) has to be kept constant due to the dynamic range requirements. In formula iii) the denominator has become variable through the discrete reference resistor with value $R_{ref}$. If one of the resistors 28 and 30 is made a fully discrete, externally accessible resistor as well, and if the other resistor and resistor 34 remain fully integrated, the term in parentheses will include a quotient involving a pair of only discrete resistors and a quotient involving a pair of only integrated resistors. A pairwise replacement of the discrete resistors enables one to select resistors that, for instance, have substantially the same temperature dependence. Due to the quotient, these dependencies will mutually cancel, thereby guaranteeing thermal stability of the circuit. With the necessary changes made, the same applies to the numerator in formulae ii) and iv).

Current Multiplier

FIG. 3 shows an example of a current multiplier circuit for use in a monolithic integrated circuit in accordance with the invention. The shown scheme includes a multiplying part 60 and a control part 62. Part 60 performs the actual current multiplication under control of part 62 that controls the value of the reference current.

Multiplying part 60 is mainly a known circuit and is also called a gain cell. See, e.g., *Linear Data Manual Volume 1: Communications*, Signetics Co., 1989, page 4-346, FIG. 9. The operation will only be discussed below to the extent that it relates to the differences between the prior art and the invention.

In the known circuit, constant current sources for supplying the reference current and twice the reference current are stationed at locations where, in accordance with the invention, transistors 64 and 66 are provided, respectively. Transistors 64 and 66 are used as adjustable current sources. To this end, transistors 64 and 66 have their base electrodes connected to control part 62.

Control part 62 is an example of a circuit that controls transistors 64 and 66 under control of a reference resistor 68 and a reference voltage at a node 70. Node 70 is connected to an inverting input of a differential amplifier 72. Its non-inverting input is connected to a node 74 between a transistor 76 and reference resistor 68 that are arranged in series between voltage supplies $V_{cc}$ and GND. The output of amplifier 72 is connected to the base of transistor 76.

This configuration sets the voltage at node 74 at the value of the reference voltage at node 70 by controlling the current through transistor 76. The value of this current equals the value of the reference voltage divided by the value of reference resistor 68. The output signal from amplifier 72 therefore is representative of this particular current. The same output signal is supplied to transistor 64. Transistors 76 and 64 have the same dimensions and are integrated on the same chip. Therefore, the current through transistor 64 equals the current through transistor 76. A transistor 78 has a control electrode coupled to the output of amplifier 72. Its main current path is coupled to GND through a transistor 80 connected as a diode, and to $V_{cc}$. Transistor 78 has the same emitter area as transistor 76. Consequently, transistors 78 and 80 conduct the same current as transistor 76. This current is mirrored to transistor 66. Transistor 66 has twice the emitter area of transistor 80 and therefore conducts twice the amount of current. Thus, the currents through transistors 64 and 66 are controllable while their ratio remains fixed.

An input resistor 82 is located in multiplying part 60. When the current multiplier circuit of FIG. 3 is used in compressor 18, resistor 82 represents resistor 30 in FIG. 1. When the circuit is used in expandor 20, resistor 82 represents resistor 50 in FIG. 1. Note that the controllability of the reference current involves both the reference voltage and the reference resistor. These controlling features may be provided both off-chip, both on-chip, or one on-chip and the other off-chip. Having a terminal for off-chip reference voltage control renders the reference current continuously controllable.

Voltage-to-Current Converter

FIG. 4 schematically shows an example of a voltage-to-current converter in the invention. The converter is a full-wave rectifier, comprising a differential amplifier 90 that drives npn-transistor 92 and pnp-transistor 94, which are arranged in serves between an input 96 of a current mirror 98 and converter output 100. An output 102 of mirror 98 is connected to converter output 100 as well. Non-inverting input 104 of amplifier 90 receives a reference voltage. Inverting input 106 is coupled to a first node 108 through first resistor 110 and to an intermediate node 112 between transistors 92 and 94. A diode 114 is located between the base electrodes of transistors 92 and 94 in order to prevent them from both being turned on at the same time. A main current path of a bias transistor 116 couples the base electrode of transistor 94 to ground under control of a voltage applied to control electrode 118.

The voltage at first node 108 is converted into an input current through first resistor 110 and turns on either transistor 92 or 94, depending on the signal polarity. When transistor 94 is turned on, its collector current is mirrored by means of mirror 98 and summed at converter output 100. The signal output current $I_c$ at converter output 100 is proportional to the time-averaged signal voltage at first node 108 and inversely proportional to first resistor 110. Converter output 100 constitutes the current source labeled $I_c$ in FIG. 3.

Transistor 116 is an adjustable bias current source and enables the maximum output current at converter output 100 to be regulated in order to adapt the power consumption to the signal levels.

Transistor 116 may be controlled in a way similar to the control of transistor 66 in FIG. 3 by connecting control electrode 118 to an associated control circuit identical to control part 62 in FIG. 3. Alternatively, both transistor 66 in FIG. 3 and transistor 116 may be simultaneously controlled by a single control part 62.

FIRST EXAMPLE IC EMBODIMENT

Figure 5:
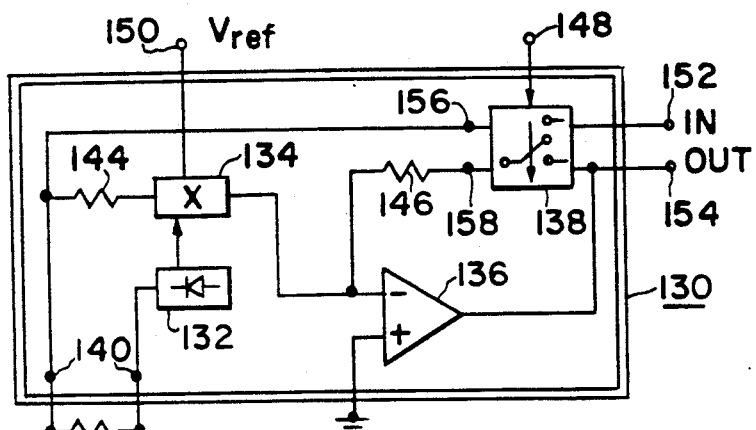
FIG. 5 schematically represents a first embodiment of a general-purpose integrated circuit in accordance with the invention.

FIG. 5 shows a first schematic example of a multipurpose monolithic integrated circuit chip 130 according to the invention. Chip 130 comprises a voltage-to-current converter 132, a current multiplier 134, a differential amplifier 136, switching means 138, connection terminals 140 for connection to an external first resistor 142, integrated second and further resistors 144 and 146, a dual mode control input 148 for controlling switching means 138, an input 150 for connection to an off-chip reference voltage supply, a signal input 152 and a signal output 154. Apart from switching means 138, all components have been discussed previously. Switching means 138 selectively either connects input 152 to node 156, and output 154 to node 158, or input 152 to node 158, and output 154 to node 156, under control of mode control input 148. In one mode, chip 130 is configured for being included in expandor 20, whereas, in the other mode, chip 130 is arranged for use in compressor 18.

SECOND EXAMPLE IC EMBODIMENT

Figure 6:
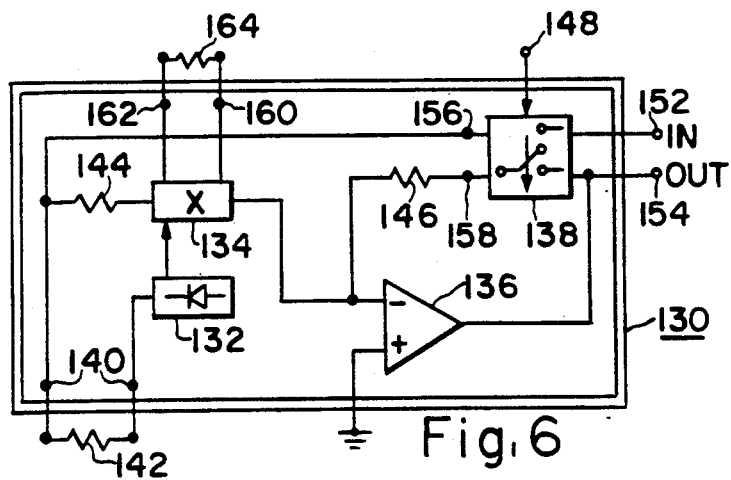
FIG. 6 schematically represents a second embodiment of a general-purpose integrated circuit in accordance with the invention.

FIG. 6 shows a second schematic example of a multipurpose monolithic integrated circuit chip according to the invention. The same reference numerals are used in FIG. 6 as in FIG. 5 for indicating identical or corresponding components. Input 150 in FIG. 5 now is replaced by terminals 160 and 162 for connection to a discrete external reference resistor 164.

We claim:

1. An electronic compandor system having a signal input, a signal compressor coupled to the signal input, a signal expandor coupled to the compressor through a transmission channel and to a signal output, at least the compressor or the expandor comprising an integrated circuit that includes:
   first and second nodes;
   a voltage-to-current converter, adapted to be coupled to the first node through a first resistor for providing at a converter output a control current indicative of a signal voltage at the first node;
   a current multiplier, adapted to be coupled to the first node through a second resistor for receiving an input current, the multiplier being coupled to the converter for receiving the control current, wherein the multiplier supplies an output current at the second node substantially proportional to the input current and to the control current and substantially inversely proportional to a reference current; and wherein the integrated circuit comprises adjustment means for externally adjusting the reference current.

2. System as in claim 1 wherein the adjustment means comprises a terminal for connection to an external reference current source.

3. System as in claim 1 wherein the adjustment means includes an externally adjustable constant current source.

4. System as in claim 3 wherein the adjustable constant current source includes a voltage-controlled current source controlled in response to an externally applied control voltage.

5. System as in claim 3 wherein the adjustable constant current source includes a reference voltage source for connection to a discrete reference resistor for generating the reference current.

6. System as in claim 5 wherein the first resistor or the second resistor is another discrete resistor.

7. System as in claim 1 wherein the converter is capable of sinking an input current received from the first node and this capability is externally adjustable.

8. System as in claim 1 wherein the integrated circuit is incorporated in the compressor which includes a differential amplifier with an inverting input, a non-inverting input and an output, the inverting input being coupled to the second node and to the signal input through a further resistor, the non-inverting input being coupled to a bias node for receiving a bias voltage, and the output being coupled to the first node and to the channel.

9. System as in claim 1 wherein the integrated circuit is incorporated in the expandor which includes a differential amplifier with an inverting input, a non-inverting input, and an output, the inverting input being coupled to the second node and to the output through a further resistor, the non-inverting input being coupled to a bias node for receiving a bias voltage, and the first node being coupled to the channel.

10. System as in claim 8 wherein the amplifier is incorporated in the integrated circuit.

11. System as in claim 9 wherein the amplifier is incorporated in the integrated circuit.

12. An integrated circuit including:
   a first node and a second node;
   a voltage-to-current converter adapted to be connected to the first node through a first resistor for providing at a control output a control current indicative of a voltage at the first node and inversely proportional to the first resistor;
   a current multiplier adapted to be coupled to the first node through a second resistor, for receiving an input current proportional to the voltage at the first node and inversely proportional to the second resistor, and coupled to the control output for receiving the control current, the multiplier supplying an output current to the second node substantially proportional to the input current and to the control current and substantially inversely proportional to a reference current; the integrated circuit further including adjustment means for externally adjusting the reference current.

13. Integrated circuit as in claim 12 wherein the adjustment means includes a terminal for connection to an external reference current source.

14. Integrated circuit as in claim 12 wherein the adjustment means comprises an externally adjustable reference current source.

15. Integrated circuit as in claim 14 wherein the reference current source comprises a voltage-controlled current source that is adjustable in response to an externally applied control voltage.

16. Integrated circuit as in claim 14 wherein the reference current source includes a reference voltage source that has externally accessible terminals for connection to a discrete reference resistor.

17. Integrated circuit as in claim 16 wherein only one of the first and the second resistors is a fully integrated resistor, the other being a discrete resistor, further externally accessible terminals being provided for connection to the other resistor.

18. Integrated circuit as in claim 12 having an input terminal, an output terminal a differential amplifier with an inverting input coupled to the second node, a non-inverting input and an output, and switching means for selectively coupling the first node to the output terminal or to the input terminal.

* * * * *